(12) United States Patent
Klaus (10) Patent No.: US 8,982,419 B1
(45) Date of Patent: Mar. 17, 2015

(54) METHOD AND APPARATUS FOR GENERATING A HALFTONE IMAGE FROM A CONTINUOUS TONE IMAGE

(71) Applicant: Marvell International Ltd., Hamilton (BM)

(72) Inventor: Richard I. Klaus, Ridgefield, WA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/896,044

(22) Filed: May 16, 2013

Related U.S. Application Data (60) Provisional application No. 61/648,726, filed on May 18, 2012.

(51) Int. Cl.
*H04N 1/405* (2006.01)
*G06K 15/02* (2006.01)

(52) U.S. Cl.
CPC .................. *G06K 15/1881* (2013.01)
USPC ........................ 358/3.06; 358/3.14

(58) Field of Classification Search
CPC ... H04N 1/4052; H04N 1/405; H04N 1/4055; H04N 1/4051; H04N 1/1911; H04N 1/407; H04N 2201/0414; H04N 1/0402; H04N 1/4072
USPC ................ 358/1.9, 3.03–3.06, 3.14, 534, 1.8, 358/3.11–3.13, 3.16, 3.2–3.23, 406, 504; 382/252, 270, 237; 347/131; 345/596; 359/893
See application file for complete search history.

(56) References Cited

U.S. PATENT DOCUMENTS

| | | | | |
|---|---|---|---|---|
| 4,811,108 A | * | 3/1989 | Numakura et al. | 358/3.14 |
| 4,833,546 A | * | 5/1989 | Numakura et al. | 358/534 |
| 5,766,807 A | * | 6/1998 | Delabastita et al. | 430/6 |
| 5,953,459 A | * | 9/1999 | Ueda et al. | 382/237 |
| 6,108,450 A | * | 8/2000 | Ueda | 382/237 |
| 7,733,535 B2 | * | 6/2010 | Plunkett et al. | 358/3.14 |
| 2007/0097159 A1 | * | 5/2007 | Bastani | 347/5 |

* cited by examiner

*Primary Examiner* — Thomas D Lee
*Assistant Examiner* — Stephen M Brinich (57) ABSTRACT

Some of the embodiments provide a method for processing a continuous tone image, wherein each pixel of a plurality of pixels of the continuous tone image is associated with a corresponding value that represents a tone of the pixel, the method comprising for each pixel of the plurality of pixels of the continuous tone image, determining the corresponding value of the pixel that represents the tone of the pixel, wherein each pixel of a first subset of the plurality of pixels of the continuous tone image has a corresponding value that is within a first range; and generating a halftone image from the continuous tone image such that for each pixel of the first subset of the plurality of pixels of the continuous tone image, a corresponding pixel of the halftone image is generated to have a value that represents a zero optical density or a first optical density.

20 Claims, 4 Drawing Sheets

METHOD AND APPARATUS FOR GENERATING A HALFTONE IMAGE FROM A CONTINUOUS TONE IMAGE

CROSS REFERENCE TO RELATED APPLICATIONS

This claims priority to U.S. Provisional Patent Application No. 61/648,726, filed on May 18, 2012, which is incorporated herein by reference.

TECHNICAL FIELD

Embodiments of the present disclosure relate to image processing, and more particularly, to a halftoning process to convert a continuous tone (contone) image to a halftone image.

BACKGROUND

In order to facilitate printing of images in a printing device, an image having continuous tones (also referred to as a "continuous tone image" or a "contone image") is often converted into an image having halftones. A pixel of the contone image may be represented, for each color plane, by a plurality of bits, e.g., 8 bits, 10 bits, or the like. Subsequent to converting the contone image into a corresponding halftone image, each pixel of the halftone image may be represented, for each color plane, by one or more bits, e.g., 1 bit, 2 bits, or the like. A halftone image may be generated from a contone image using, for example, one of error diffusion halftoning process, multi-bit halftoning process, threshold halftoning process, or the like.

As discussed, in a halftone image, each pixel is represented by, for example, one or more bits of data. For example, a one bit data associated with a pixel of a halftone image represents whether, during a printing process, a dot is to be placed corresponding to the pixel. A two bit data associated with a pixel of a halftone image represents, during a printing process, whether a dot is to be placed corresponding to the pixel, and a level of the dot (e.g., a size, a tone, an optical density with which the corresponding pixel of the halftone image is to be printed while printing the halftone image, or the like).

When a laser printer prints a halftone image, dots of low optical density (e.g., small sized dots) tend not to form very well. For example, a process of placing charge on a developer roller of an Electrophotographic engine (which is commonly found in laser printers) and causing toner to jump to the developer roller (e.g., prior to printing the image) works relatively better with dots of medium or high optical density (e.g., medium or large sized dots), e.g., compared to dots of low optical density. If dots of low optical density (e.g., which corresponds to small charge in the developer roller) are used, then the output image tends to form a dusting of toner, rather than true dots. Such dusting of toner for dots of low optical density is generally acceptable when the dots are isolated (e.g., spaced sufficiently apart) in the printed image.

However, if dots (e.g., dots of low or medium optical density) are placed in close proximity in a halftone image, while printing the dots in a laser printer, these dots start to reinforce one another and create clumps. This may cause the printed image to appear grainy and of relatively poor quality.

SUMMARY

In various embodiments, the present disclosure provides a method for processing a continuous tone image, wherein the continuous tone image comprises a plurality of pixels, wherein each pixel of the plurality of pixels of the continuous tone image is associated with a corresponding value that represents a tone of the pixel, the method comprising: for each pixel of the plurality of pixels of the continuous tone image, determining the corresponding value of the pixel that represents the tone of the pixel, wherein (i) each pixel of a first subset of the plurality of pixels of the continuous tone image has a corresponding value that is within a first range and (ii) each pixel of a second subset of the plurality of pixels of the continuous tone image has a corresponding value that is within a second range; and generating a halftone image from the continuous tone image, such that the halftone image comprises a plurality of pixels corresponding to the plurality of pixels of the continuous tone image, wherein each pixel of the plurality of pixels of the halftone image is associated with a corresponding value that represents an optical density with which the pixel of the halftone image is to be printed, wherein generating the halftone image comprises for each pixel of the first subset of the plurality of pixels of the continuous tone image, generating a corresponding pixel of the halftone image to have a value that represents (i) zero optical density or (ii) a first optical density, and for each pixel of the second subset of the plurality of pixels of the continuous tone image, generating a corresponding pixel of the halftone image to have a value that represents (i) zero optical density or (ii) a second optical density, wherein the second optical density is different from the first optical density.

There is also provided an image processing apparatus configured to process a continuous tone image, wherein the continuous tone image comprises a plurality of pixels, wherein each pixel of the plurality of pixels of the continuous tone image is associated with a corresponding value that represents a tone of the pixel, the image processing apparatus comprising a halftone conversion module configured to for each pixel of the plurality of pixels of the continuous tone image, determine the corresponding value of the pixel that represents the tone of the pixel, wherein (i) each pixel of a first subset of the plurality of pixels of the continuous tone image has a corresponding value that is within a first range and (ii) each pixel of a second subset of the plurality of pixels of the continuous tone image has a corresponding value that is within a second range; and generate a halftone image from the continuous tone image, such that the halftone image comprises a plurality of pixels corresponding to the plurality of pixels of the continuous tone image, wherein each pixel of the plurality of pixels of the halftone image is associated with a corresponding value that represents an optical density with which the pixel of the halftone image is to be printed, wherein the halftone conversion module is further configured to generate the halftone image by for each pixel of the first subset of the plurality of pixels of the continuous tone image, generating a corresponding pixel of the halftone image to have a value that represents of one of (i) a zero optical density or (ii) a first optical density, and for each pixel of the second subset of the plurality of pixels of the continuous tone image, generating a corresponding pixel of the halftone image to have a value that represents of one of (i) the zero optical density or (ii) a second optical density.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

DETAILED DESCRIPTION

Figure 1:
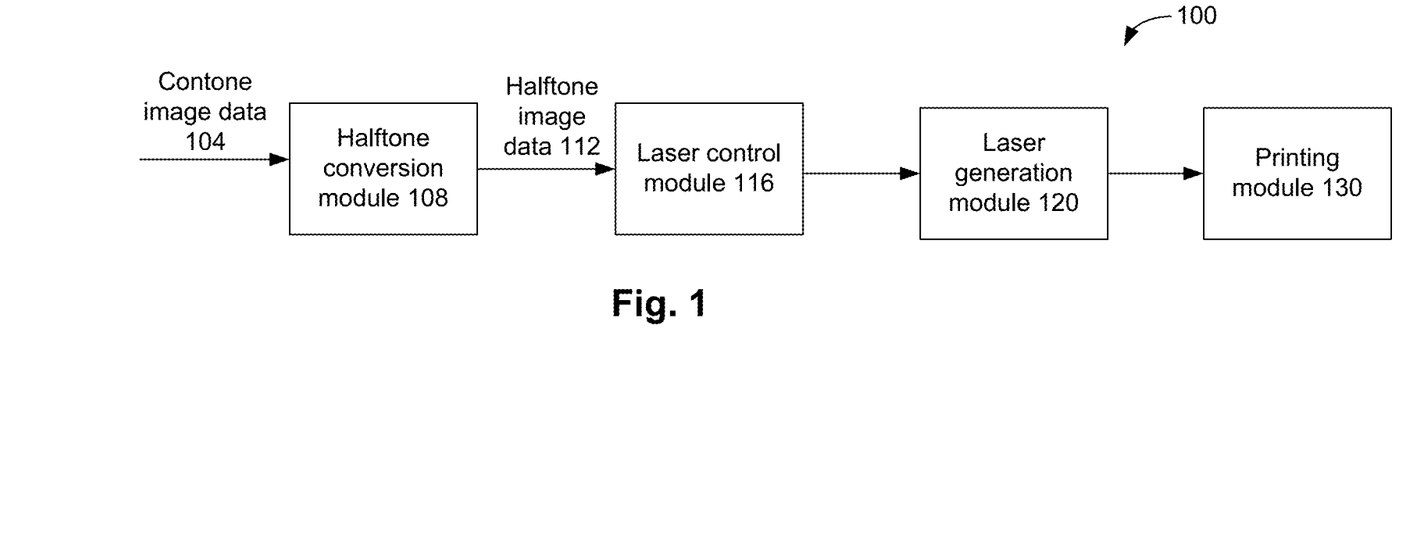
FIG. 1 schematically illustrates an image processing system configured to convert a contone image to a halftone image, and print the halftone image.

FIG. 1 schematically illustrates an image processing system 100 (henceforth referred to as "system 100") configured to convert a contone image to a halftone image, and print the halftone image. The system 100 (or at least a part of the system 100) may be implemented, for example, within a printing device that employs laser beams for printing (e.g., implemented within a laser printer).

The system 100 comprises a halftone conversion module 108 configured to receive a contone image data 104, and convert the contone image data 104 to halftone image data 112. The halftone image data 112 is used by a laser control module 116 to control a laser generation module 120 generating a laser beam. The laser beam generated by the laser generation module 120 is used by a printing module 130 (which comprises, for example, a developer roller of an Electrophotographic engine, not illustrated in FIG. 1) to print an image corresponding to the halftone image data 112. The laser control module 116, the laser generation module 120 and the printing module 130 are well known to those skilled in the art, and hence, a detailed description of these components will not be provided herein.

Figure 2:
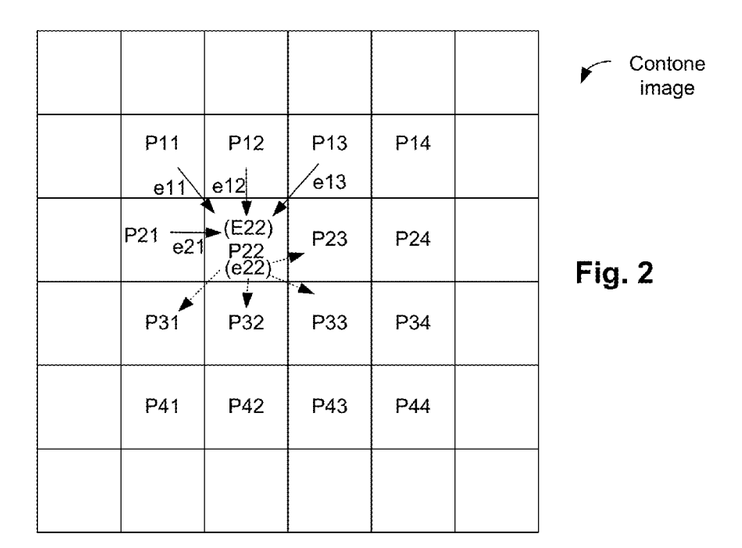
FIG. 2 illustrates an example of a contone image comprising a plurality of pixels.

The contone image data 104 comprises a plurality of pixels of a contone image. FIG. 2 illustrates an example of the contone image comprising a plurality of pixels, only some of which are labeled in FIG. 2. For example, pixels P11, P12, ..., P44 are labeled in FIG. 2. The pixels illustrated in FIG. 2 form the contone image (or are a part of the contone image).

Each pixel of the plurality of pixels of the contone image is associated with a corresponding contone pixel value that represents a tone of a given color plane of the corresponding pixel. For example, the pixel P11 of the contone image data 104 is associated with a corresponding pixel value that represents a tone of a given color plane (e.g., represents a tone of a grey scale color plane) of the pixel P11. Similarly, other pixels of the contone image data 104 are also associated with corresponding pixel values. The contone image data 104 comprises the pixel values of the pixels of the contone image.

While the halftone conversion module 108 generates the halftone image data 112 from the contone image data 104, each pixel of the contone image is converted to a corresponding pixel of the halftone image. In an embodiment, a modified version of error diffusion halftoning is used to convert the contone image to the halftone image, as will be discussed herein later. Error diffusion halftoning is a type of halftoning in which quantization residual (or quantization error) of a pixel, which is currently being processed, is distributed to neighboring pixels that have not yet been processed, while performing the halftoning process.

In an embodiment, conversion of a pixel of the contone image to a corresponding pixel of the halftone image is based on, for example, (i) a contone pixel value of the pixel of the contone image and (ii) errors propagated from one or more neighboring pixels that were already processed. For example, FIG. 2 illustrates a situation when a pixel P22 of the contone image is being processed for conversion to a corresponding pixel of the halftone image. The pixel P22 is also referred to as a "current pixel", as pixel P22 is being currently processed. Also, while the current pixel P22 is being processed, pixels P11, ..., P14 and P21 were already processed and converted to pixels of the halftone image.

While the pixel P11 was previously processed, a quantization error (henceforth referred to as "error") was generated during the conversion process (generation of error is discussed herein later in detail). The error is propagated to one or more neighboring pixels (e.g., one or more neighboring pixels that are to be processed subsequent to processing of the pixel P11). For example, part of the error of pixel P11 is propagated to pixel P12, part of the error of pixel P11 is propagated to pixel P21, part of the error of pixel P11 is propagated to pixel P22, and so on. A part of the error of pixel P11, which is propagated to the pixel P22, is labeled as e11 in FIG. 2.

Similarly, the pixel P22 may receive errors from pixels P12, P13 and P21. For example, a part of an error associated with pixel P12, which is propagated to the pixel P22, is labeled as e12 in FIG. 2; a part of an error associated with pixel P13, which is propagated to the pixel P13, is labeled as e13 in FIG. 2; and a part of an error associated with pixel P21, which is propagated to the pixel P22, is labeled as e21 in FIG. 2. A sum of errors received by the current pixel P22 from one or more neighboring pixels (e.g., which have already been processed) is represented by E22, which is equal to (e11+e12+e13+e21). E22 is also referred to herein as a "sum of errors" associated with the pixel P22.

Although the pixel P22 is illustrated to receive errors from four neighboring pixels P11, P12, P13 and P21, in another embodiment and although not illustrated in FIG. 2, the pixel P22 may receive errors from any different number or combination of neighboring pixels.

In an embodiment, the conversion of the pixel P22 of the contone image to the corresponding pixel of the halftone image is based on (i) the contone pixel value of the pixel P22 and (ii) the sum of errors E22 propagated from the neighboring pixels P1, P12, P13 and P21 to the pixel P22.

In an embodiment, each pixel of the halftone image has, for example, two bits (although each pixel may comprise any other appropriate number of bits). For example, a two bit halftone pixel data associated with a pixel of the halftone image data 112 represents, during a printing process, whether a dot is to be placed corresponding to the pixel, and a level of the dot (e.g., a size, a tone, an optical density with which the corresponding pixel of the halftone image is to be printed while printing the halftone image, or the like). For example, for a two bit data associated with a pixel of the halftone image, a value of 00 indicates that no dot is to be placed corresponding to the pixel when the halftone image is to be printed by the system 100, a value of 01 indicates that a low optical density dot (e.g., a small dot, a low tone dot, or the like) is to be placed corresponding to the pixel when the halftone image is to be printed by the system 100, a value of 10 indicates that a medium optical density dot (e.g., a medium sized dot, a medium tone dot, or the like) is to be placed corresponding to the pixel when the halftone image is to be printed by the system 100, and a value of 11 indicates that a high optical density dot (e.g., a large dot, a high tone dot, or the like) is to be placed corresponding to the pixel when the halftone image is to be printed by the system 100.

Figure 3:
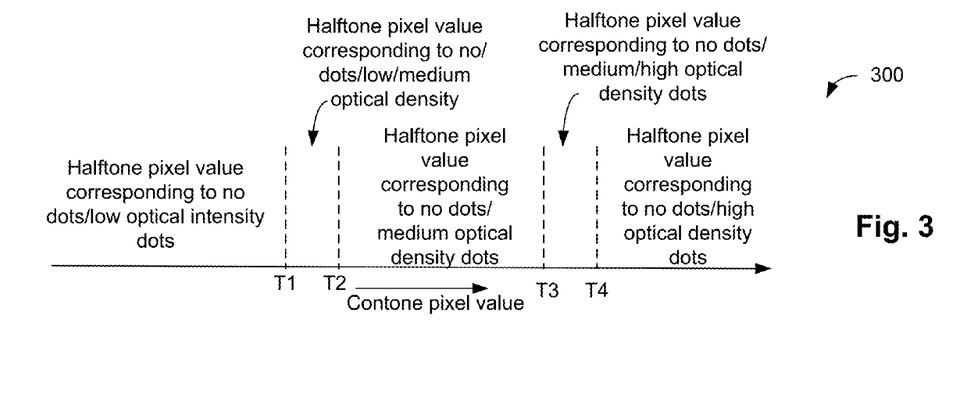
FIG. 3 illustrates a graph that maps a contone pixel value of a pixel of a contone image to a corresponding halftone pixel value of a corresponding pixel of a halftone image.

FIG. 3 illustrates a graph 300 that maps a contone pixel value of a pixel of the contone image to a corresponding halftone pixel value of the corresponding pixel of the halftone image. In an embodiment, the graph 300 is used by the halftone conversion module 108, while converting the contone image data 104 to the halftone image data 112.

The graph 300 is a one dimensional graph, with the x axis representing contone pixels values of the pixels of the contone image. The x axis is divided in pre-determined threshold values T1, T2, T3 and T4. The threshold values T1, T2, T3 and T4 may be determined based on, for example, characteristics of the system 100, a number of bits included in the contone image data 104, and/or the like. In an embodiment, the threshold T4 is higher than the threshold T3, the threshold T3 is higher than the threshold T2, and the threshold T2 is higher than the threshold T1, as illustrated in FIG. 3.

Referring to FIGS. 2 and 3, in an embodiment, while converting the current pixel P22 of the contone image to the halftone image, the contone pixel value of the pixel P22 is determined. The contone pixel value of the pixel P22 is included in the contone image data 104.

In an embodiment and as illustrated in FIG. 3, if the contone pixel value of the pixel P22 is less than the threshold T1, the corresponding halftone pixel value is generated, such that either (i) no dots are placed or (ii) a dot of low optical density is placed for the pixel while printing the corresponding halftone image. For example, a halftone pixel value of either 00 or 01 is assigned to the pixel P22, if the contone pixel value is less than T1. Halftone pixel value corresponding to a dot of medium or high optical density (i.e., a halftone pixel value of 10 or 11) is never assigned to the pixel P22, if the contone pixel value of the pixel P22 is less than the threshold T1 (even if, for example, a sum of the (i) contone pixel value and (ii) the sum of errors E22 require an assignment of a medium or a high optical density dot according to the error diffusion halftoning process). The decision of whether to assign the halftone pixel value of 00 or 01 to the pixel P22 is based on the sum of the (i) contone pixel value of the pixel P22 and (ii) the sum of errors E22. For example, if the sum of the (i) contone pixel value of the pixel P22 and (ii) the sum of errors E22 is above a threshold value (which is different from the thresholds illustrated in FIG. 3), a halftone pixel value of 01 is assigned; else a halftone pixel value of 00 is assigned. Thus, in the embodiment illustrated in FIG. 3, irrespective of the sum of errors E22, the halftone pixel value of the pixel P22 does not correspond to a medium or high optical density dot (i.e., can have a value of only 00 or 01), if the contone pixel value is less than the threshold T1. Thus, while the halftone image is being printed, pixels with contone pixel values less than threshold T1 will be printed either using a small sized, low tone dots (i.e., dots having low optical density), or no dots will be printed at all.

In an embodiment, if the contone pixel value of the pixel P22 is between thresholds T2 and T3, the corresponding halftone pixel value is generated, such that either (i) no dots are placed or (ii) a dot of medium optical density is placed for the pixel while printing the corresponding halftone image. For example, a halftone pixel value of either 00 or 10 is assigned to the pixel P22, if the contone pixel value is between thresholds T2 and T3. However, a halftone pixel value corresponding to a dot of low or high optical density (i.e., a halftone pixel value of 01 or 11) is never assigned to the pixel P22, if the contone pixel value of the pixel P22 is between thresholds T2 and T3 (even if, for example, a sum of the (i) contone pixel value of the pixel P22 and (ii) the sum of errors E22 requires an assignment of a low or a high optical density dot according to the error diffusion halftoning process). The decision of whether to assign the halftone pixel value of 00 or 10 to the pixel P22 is based on the sum of the (i) contone pixel value of the pixel P22 and (ii) the sum of errors E22. For example, if the sum of the (i) contone pixel value of the pixel P22 and (ii) the sum of errors E22 is above a threshold value (which is different from the thresholds illustrated in FIG. 3), a halftone pixel value of 10 is assigned; else a halftone pixel value of 00 is assigned. Thus, while the halftone image is being printed, pixels that had contone pixel values between T2 and T3 will be printed either using medium sized, medium tone dots (i.e., dots having medium optical density), or no dots will be printed at all.

In an embodiment, if the contone pixel value of the pixel P22 is higher than the threshold T4, the corresponding halftone pixel value is generated, such that either (i) no dots are placed or (ii) a dot of high optical density is placed for the pixel while printing the corresponding halftone image. For example, a halftone pixel value of either 00 or 11 is assigned to the pixel P22, if the contone pixel value is higher than the threshold T4. That is, a halftone pixel value corresponding to a dot of low or medium optical density (i.e., a halftone pixel value of 01 or 10) is never assigned to the pixel P22, if the contone pixel value of the pixel P22 is higher than the threshold T4 (even if, for example, a sum of the (i) contone pixel value and (ii) the sum of errors E22 requires an assignment of a low or a medium optical density dot according to the error diffusion halftoning process). The decision of whether to assign the halftone pixel value of 00 or 11 to the pixel P22 is based on the sum of the (i) contone pixel value of the pixel P22 and (ii) the sum of errors E22. For example, if the sum of the (i) contone pixel value of the pixel P22 and (ii) the sum of errors E22 is above a threshold value (which is different from the thresholds illustrated in FIG. 3), a halftone pixel value of 11 is assigned; else a halftone pixel value of 00 is assigned. Thus, while the halftone image is being printed, pixels with contone pixel values higher than the threshold T4 will be printed either using large sized, high tone dots (i.e., dots having high optical density), or no dots will be printed at all.

In an embodiment, if the contone pixel value of the pixel P22 is between thresholds T1 and T2, the corresponding halftone pixel value is generated, such that one of (i) no dots, (ii) a low optical density dot, or (iii) a medium optical density dot is placed for the pixel while printing the corresponding halftone image (e.g., based on the sum of the (i) contone pixel value of the pixel P22 and (ii) the sum of errors E22). Thus, for contone pixel value of the pixel P22 between thresholds T1 and T2, high optical density dots are never assigned (e.g., irrespective of the sum of the (i) contone pixel value of the pixel P22 and (ii) the sum of errors E22), as illustrated in FIG. 3.

In an embodiment, if the contone pixel value of the pixel P22 is between thresholds T3 and T4, the corresponding halftone pixel value is generated, such that one of (i) no dots, (ii) a medium optical density dot, or (iii) a high optical density dot is placed for the pixel P22 while printing the corresponding halftone image (e.g., based on the sum of the (i) contone pixel value of the pixel P22 and (ii) the sum of errors E22). Thus, for contone pixel value of the pixel P22 between thresholds T1 and T2, low optical density dots are never assigned (e.g., irrespective of the sum of the (i) contone pixel value of the pixel P22 and (ii) the sum of errors E22), as illustrated in FIG. 3.

Put differently, as illustrated in FIG. 3, if the contone pixel value of the pixel P22 is less than the threshold T1, the halftone pixel value corresponds to either no dot or a low optical density dot; if the contone pixel value of the pixel P22 is between thresholds T1 and T2, the halftone pixel value corresponds to one of (i) no dot, (ii) a low optical density dot, or (iii) a medium optical density dot; if the contone pixel value of the pixel P22 is between thresholds T2 and T3, the halftone pixel value corresponds either to a medium optical density dot or no dot; if the contone pixel value of the pixel P22 is between thresholds T3 and T4, the halftone pixel value corresponds to one of (i) no dots, (ii) a medium optical density dot, or (iii) a high optical density dot; and if the contone pixel value of the pixel P22 is higher than the threshold T4, the halftone pixel value corresponds to either no dot or a high optical density dot. The thresholds T1, . . . , T4 divides the contone pixel value in several regions, where for each region, assignment of one or more optical density dots is restricted. For example, as previously discussed, for a pixel with contone value less than the threshold T1, assignment of a medium or a high optical density dot is restricted, irrespective of the sum of errors associated with the pixel. In contrast, no such thresholds exist for a conventional error diffusion halftoning process. For example, in a conventional error diffusion halftoning process, even if the pixel P22 has a contone value less than the threshold T1, a relatively high sum of errors E22 may result in an assignment of a medium or a high optical density dot for the halftone pixel.

Furthermore, the selective restrictions on certain types of optical density dots imposed by the graph 300 of FIG. 3 do not significantly impact the quality or tone of the printed halftone image. The tone of the original contone image is preserved in the halftone image (e.g., as the errors are appropriately propagated to neighboring pixels during the conversion process)—however, the graph 300 imposes a limit on the type of optical density dots that are selectively used to preserve the tone of the original contone image in the halftone image.

Also, as illustrated in FIG. 2, subsequent to the processing and conversion of the pixel P22 to a corresponding pixel in the halftone image, a quantization error e22 is generated for the pixel P22. The error e22 is based on, for example, a difference between (i) a sum of (A) the contone pixel value of the pixel P22 and (B) the sum of errors E22, and (ii) a contone value which corresponds to the halftone pixel value assigned to the corresponding pixel in the halftone image. The generation of the error e22 in the system 100 is similar to generation of quantization errors in a conventional error diffusion halftoning process, and hence, will not be discussed in detail herein. The error e22 from the pixel P22 is propagated to one or more neighboring pixels that are yet to be processed, e.g., to pixels P23, P31, P32 and/or P33.

Figure 4A:
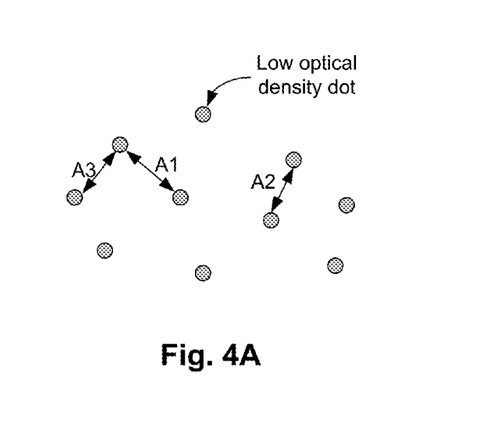
FIGS. 4A-4D illustrate magnified versions of printouts of regions of a halftone image.
Figure 4B:
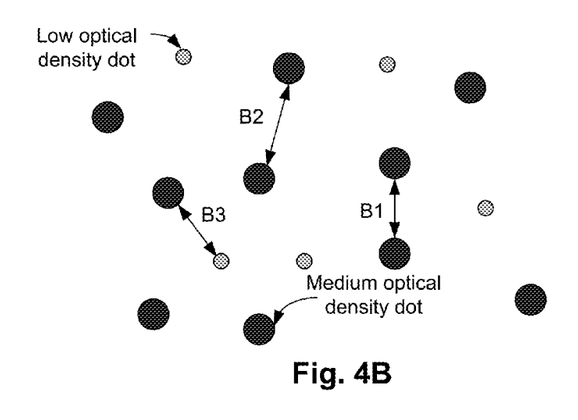
Figure 4C:
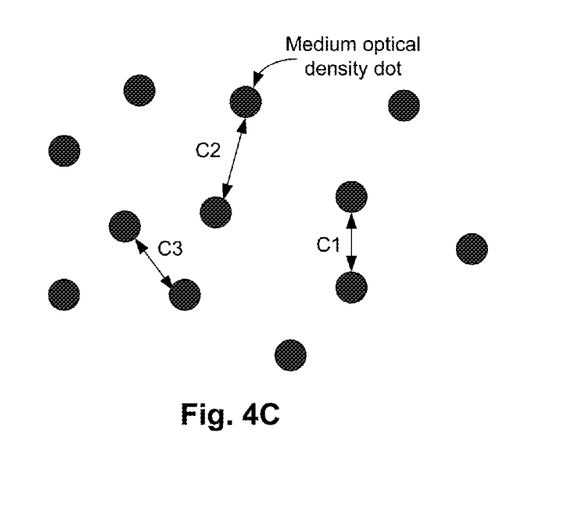

FIG. 4A illustrates a magnified version of a printout of a region of the halftone image, when the contone pixel values of the pixels of the region of the corresponding contone image are less than or equal to the threshold Ti. FIG. 4B illustrates a magnified version of a printout of a region of the halftone image, when the contone pixel values of the pixels of the region of the corresponding contone image are between thresholds T1 and T2. FIG. 4C illustrates a magnified version of a printout of a region of the halftone image, when the contone pixel values of the pixels of the region of the corresponding contone image are between thresholds T2 and T3.

Figure 4D:
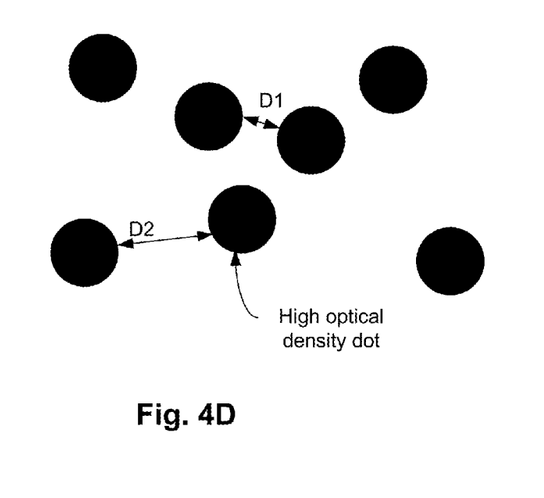

FIG. 4D illustrates a magnified version of a printout of a region of the halftone image, when the contone pixel values of the pixels of the region of the corresponding contone image are greater than the threshold T4.

Referring to FIGS. 3 and 4A, as the contone pixel values of the pixels of the region of the corresponding contone image are less than or equal to the threshold T1, only low optical density dots (e.g., small sized dos) are formed corresponding to some of the pixels (and no dots are formed corresponding to other pixels) in FIG. 4A. As the contone pixel values of the pixels of this region are relatively low (e.g., lower than the threshold T1), the dots in FIG. 4A are sufficiently spaced apart. For example, distances between the dots in FIG. 4A are labeled as A1, A2 and A3, where each of these distances is greater than a threshold distance (e.g., which may be equal to, for example, at least two pixel lengths, or three pixel lengths, or the like).

In FIG. 4B, dots of both low and medium optical densities are placed. In FIG. 4B, the distances between the dots are labeled as B1, B2 and B3, where each of these distances is greater than the threshold distance (e.g., as the contone pixel values of the pixels of this region is still relatively low, the error diffusion halftoning process and the propagation of errors ensure that the dots are sufficiently spaced apart).

Referring to FIGS. 3 and 4C, as the contone pixel values of the pixels of the region of the corresponding contone image starts increasing (e.g., between thresholds T2 and T3), only medium optical density dots (or no dots) are formed, as illustrated in FIG. 4C. Because of the reasons discussed with respect to FIG. 3, no low optical density dots are allowed to be placed in FIG. 4C. Medium optical density dots are formed for a pixel (e.g., as illustrated in FIG. 4C) only when the (i) contone pixel value and (ii) the sum of errors for the pixel exceeds a threshold value associated with the error diffusion halftoning process. As the contone pixel value in the region between T2 and T3 is still relatively small, a medium dot is placed only when the sum of errors for a pixel is sufficiently large. As it takes errors to propagate from at least a few pixels for the sum of errors of the current pixel to be large enough, the dots in FIG. 4C are also sufficiently spaced apart. In contrast, in a conventional error diffusion halftoning process, pixels with contone pixel values between thresholds T2 and T3 can be selectively assigned low optical density dots, which may result in, for example, two low optical density dots being placed in close proximity to each other. However, as discussed with respect to FIG. 3, by preventing formation of low optical density dots for pixels with contone pixel values between thresholds T2 and T3 (i.e., by allowing only medium optical density dots or no dots at all), the medium optical density dots are sufficiently spaced apart (e.g., spaced apart by at least a threshold distance) in FIG. 4C. For example, in FIG. 4C, the distances between the dots are labeled as C1, C2 and C3, where each of these distances is greater than the threshold distance.

As discussed, FIG. 4D corresponds to a region of the halftone image, where the contone pixel values of the pixels are greater than the threshold T4. Accordingly, only high optical density dots are illustrated in FIG. 4D. If there were no restrictions in the type of dots in FIG. 4D (e.g., if a conventional error diffusion halftoning process were implemented), the resulting halftone image could have low, medium and/or high optical density dots placed in close proximity to each other. However, by allowing only high optical density dots in FIG. 4D, the dots in FIG. 4D are relatively more spaced apart (e.g., compared to the situation where all optical density dots were allowed, as in a conventional error diffusion halftoning process). As the contone pixel value of pixels keeps on increasing, the dots in FIG. 4D will come closer and will be located in close proximity. However, the restrictions imposed by the graph 300 spaces the dots apart in FIG. 4D to the extent possible. Also, with the restrictions imposed by the graph 300, only high optical density dots can be proximally located. In an embodiment, in FIG. 3, the region between the thresholds T1 and T2, and the region between the thresholds T3 and T4 provide a smooth transition between dots of different optical densities. For example, the region between the thresholds T1 and T2 provides a smooth transition between low optical density dot regions and medium optical density dot regions in the printed image. Such transitions prevent (or reduce) visual distinction between various regions (e.g., having various contone pixel values) of the image printed by the system 100.

As previously discussed, in a laser printer, if dots (e.g., dots of low or medium optical density) are placed in close proximity in a halftone image, these dots start to reinforce one another and create clumps while printing the dots. This may cause the printed image to appear grainy and of poor quality. In an embodiment, in the system 100, the dots (e.g., low optical density dots, medium optical density dots, etc.) in the halftone image are sufficiently spaced apart (e.g., due to the restrictions imposed by the graph 300 spaces), thereby improving a quality of image printed by the system 100.

In FIG. 3, various threshold values (e.g., thresholds T1, . . . , T4) are used to describe a manner in which various optical density dots are allowed to form. For example, if a contone pixel value if between thresholds T3 and T4, the corresponding halftone pixel value corresponds to no dots, medium optical density dots or high optical density dots (i.e., no low optical density dots are allowed to be formed).

However, in another embodiment, start and stop limits can be used (e.g., instead of, or in addition to the threshold levels) to describe a manner in which various optical density dots are allowed to form. A start limit for a specific optical density dot is a minimum contone pixel value at which the specific optical density dot is allowed to form, and a stop limit for the specific optical density dot is a maximum contone pixel value at which the specific optical density dot is allowed to form. For example, in FIG. 3, a halftone pixel value of a halftone pixel is allowed to correspond to a low optical density dot only if the corresponding contone pixel value is less than contone pixel value T2. Thus, in FIG. 3, a start limit for low density dots is zero contone pixel value and a stop limit for low density dots is contone pixel value T2. Similarly, a halftone pixel value of a halftone pixel is allowed to correspond to a medium optical density dot only if the corresponding contone pixel value is between contone pixel values T1 and T4. Thus, a start limit for medium density dots is contone pixel value T1 and a stop limit for medium optical density dots is contone pixel value T4. Similarly, a halftone pixel value of a halftone pixel is allowed to correspond to a high optical density dot only if the corresponding contone pixel value is higher than the contone pixel value T3. Thus, a start limit for high density dots is contone pixel value T3 and a stop limit for high optical density dots is a highest possible contone pixel value.

Although FIG. 3 illustrates a specific example of various start and stop limits for various optical density dots, in an embodiment, the various optical density dots may be formed in a different manner. Merely as an example, in an embodiment, a start limit for low density dots can be zero contone pixel value and a stop limit for low density dots can be contone pixel value T2; a start limit for medium density dots can be zero contone pixel value (e.g., instead of the contone pixel value T1, as illustrated in FIG. 3) and a stop limit for medium density dots can be contone pixel value T4; and a start limit for high density dots can be contone pixel value T3.

It is to be noted that if the start and stop limits for all the types of optical density dots (e.g., low, medium and high optical density dots) are set to zero and a highest contone pixel value, respectively, then such an implementation would be similar to a conventional error diffusion process (e.g., where there is no restriction of a type of optical density dot that is allowed to form).

Figure 5:
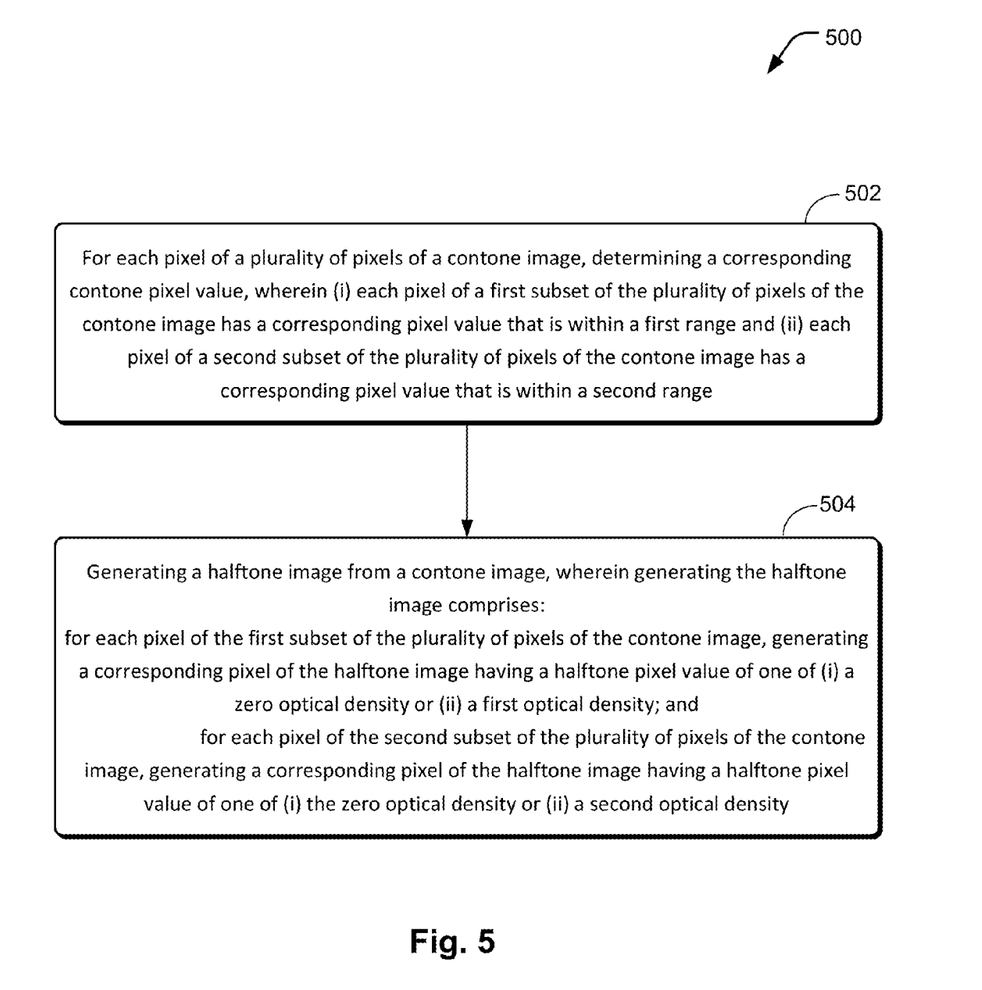
FIG. 5 illustrates an example method for converting a contone image to a halftone image.

FIG. 5 illustrates an example method 500 for converting a contone image to a halftone image (e.g., by the halftone conversion module 108 of the system 100). At 502, for each pixel of a plurality of pixels of a contone image, a corresponding contone pixel value is determined (e.g., by the halftone conversion module 108 of the system 100). In an embodiment, (i) each pixel of a first subset of the plurality of pixels of the contone image has a corresponding pixel value that is within a first range (e.g., less than the threshold T1 of FIG. 3) and (ii) each pixel of a second subset of the plurality of pixels of the contone image has a corresponding pixel value that is within a second range (e.g., between the thresholds T2 and T3 of FIG. 3).

At 504, a halftone image is generated from a contone image (e.g., by the halftone conversion module 108 of the system 100). In an embodiment, for each pixel of the first subset of the plurality of pixels of the contone image, a corresponding pixel of the halftone image has a halftone pixel value of one of (i) a zero optical density or (ii) a first optical density (e.g., a zero or a low optical density for pixels having contone pixel values less than threshold T1). In an embodiment, for each pixel of the second subset of the plurality of pixels of the contone image, a corresponding pixel of the halftone image has a halftone pixel value of one of (i) the zero optical density or (ii) a second optical density (e.g., a zero or a medium optical density for pixels having contone pixel values within the thresholds T2 and T3).

In accordance with various embodiments, an article of manufacture may be provided that includes a storage medium having instructions stored thereon that, if executed, result in the operations described herein with respect to the method 500 (and/or various other operations discussed herein). In an embodiment, the storage medium comprises some type of non-transitory memory (not shown). In accordance with various embodiments, the article of manufacture may be a computer-readable medium such as, for example, software or firmware.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A method for processing a continuous tone image, wherein the continuous tone image comprises a plurality of pixels, wherein each pixel of the plurality of pixels of the continuous tone image is associated with a corresponding value that represents a tone of the pixel, the method comprising:
   for each pixel of the plurality of pixels of the continuous tone image, determining, by an image processing apparatus, the corresponding value of the pixel that represents the tone of the pixel, wherein (i) each pixel of a first subset of the plurality of pixels of the continuous tone image has a corresponding value that is within a first range and (ii) each pixel of a second subset of the plurality of pixels of the continuous tone image has a corresponding value that is within a second range; and
   generating, by the image processing apparatus, a halftone image from the continuous tone image such that the halftone image comprises a plurality of pixels corresponding to the plurality of pixels of the continuous tone image, wherein each pixel of the plurality of pixels of the halftone image is associated with a corresponding value that represents an optical density with which the pixel of the halftone image is to be printed,
   wherein generating the halftone image comprises
      for each pixel of the first subset of the plurality of pixels of the continuous tone image, generating a corresponding pixel of the halftone image to have a value that represents (i) zero optical density or (ii) a first optical density, and
      for each pixel of the second subset of the plurality of pixels of the continuous tone image, generating a corresponding pixel of the halftone image to have a value that represents (i) a zero optical density or (ii) a second optical density, wherein the second optical density is different from the first optical density.

2. The method of claim 1, wherein generating the halftone image further comprises:
   for each pixel of the first subset of the plurality of pixels of the continuous tone image, preventing the corresponding pixel of the halftone image to have a value that represents each of (i) the second optical density or (ii) a third optical density, wherein the third optical density is different from the first optical density and the second optical density.

3. The method of claim 2, further comprising:
   determining, for each pixel of the plurality of pixels of the continuous tone image, a sum of quantization errors propagated from one or more corresponding neighboring pixels of the continuous tone image, wherein for a neighboring pixel of the continuous tone image, a quantization error is generated while converting a value of the neighboring pixel of the continuous tone image to a corresponding value of a corresponding pixel of the halftone image,
   wherein preventing the corresponding pixel of the halftone image to have the value that represents each of (i) the second optical density or (ii) the third optical density further comprises
   for each pixel of the first subset of the plurality of pixels of the continuous tone image, preventing the corresponding pixel of the halftone image to have the value that represents each of (i) the second optical density or (ii) the third optical density, irrespective of the corresponding sum of quantization errors determined for the corresponding pixel of the first subset of the plurality of pixels of the continuous tone image.

4. The method of claim 1, wherein each pixel of a third subset of the plurality of pixels of the continuous tone image has a corresponding value that is within a third range, and wherein the method further comprises:
   determining, for each pixel of the plurality of pixels of the continuous tone image, a sum of quantization errors propagated from one or more corresponding neighboring pixels of the continuous tone image, wherein for a neighboring pixel of the continuous tone image, a quantization error is generated while converting a value of the neighboring pixel to a corresponding value of a corresponding pixel of the halftone image,
   wherein generating the halftone image further comprises
      for each pixel of the third subset of the plurality of pixels of the continuous tone image, irrespective of the corresponding sum of quantization errors determined for the corresponding pixel of the third subset of the plurality of pixels of the continuous tone image, generating the corresponding pixel of the halftone image having a value that represents only one of (i) a zero optical density or (ii) a third optical density.

5. The method of claim 1, wherein each pixel of a third subset of the plurality of pixels of the continuous tone image has a corresponding value that is within a third range, and wherein generating the halftone image further comprises:
   for each pixel of the third subset of the plurality of pixels of the continuous tone image,
      generating a corresponding pixel of the halftone image having a value that represents one of (i) the zero optical density, (ii) the first optical density, or (iii) the second optical density, and
      preventing the corresponding pixel of the halftone image to have a value that represents a third optical density.

6. The method of claim 1, further comprising:
   determining, for each pixel of the plurality of pixels of the continuous tone image, a sum of quantization errors propagated from one or more corresponding neighboring pixels of the continuous tone image, wherein for a neighboring pixel of the continuous tone image, a corresponding quantization error is generated while converting a value of the neighboring pixel to a corresponding value of a corresponding pixel of the halftone image,
   wherein for each pixel of the first subset of the plurality of pixels of the continuous tone image, generating the corresponding pixel of the halftone image comprises
      for a first pixel of the first subset of the plurality of pixels of the continuous tone image, in response to a sum of (i) a corresponding value of the first pixel and (ii) a corresponding sum of quantization errors of the first pixel exceeding a threshold value, assigning a value that represents the first optical density to the corresponding pixel of the halftone image.

7. The method of claim 6, wherein for each pixel of the first subset of the plurality of pixels of the continuous tone image, generating the corresponding pixel of the halftone image comprises:

for a second pixel of the first subset of the plurality of pixels of the continuous tone image, in response to a sum of (i) a corresponding value of the second pixel and (ii) a corresponding sum of quantization errors of the second pixel being less than the threshold value, assigning a value that represents the zero optical density to the corresponding pixel of the halftone image.

8. The method of claim 1, wherein the first optical density comprises a low optical density and the second optical density comprises a medium optical density.

9. The method of claim 1, further comprising:

for one or more pixels of the plurality of pixels of the halftone image, generating a laser beam based on a corresponding value of the corresponding pixel of the halftone image; and based on the generated laser beam, printing the halftone image.

10. The method of claim 1, further comprising:

printing the halftone image using a laser printer.

11. An image processing apparatus configured to process a continuous tone image, wherein the continuous tone image comprises a plurality of pixels, wherein each pixel of the plurality of pixels of the continuous tone image is associated with a corresponding value that represents a tone of the pixel, the image processing apparatus comprising:

a halftone conversion module configured to for each pixel of the plurality of pixels of the continuous tone image, determine the corresponding value of the pixel that represents the tone of the pixel, wherein (i) each pixel of a first subset of the plurality of pixels of the continuous tone image has a corresponding value that is within a first range and (ii) each pixel of a second subset of the plurality of pixels of the continuous tone image has a corresponding value that is within a second range; and generate a halftone image from the continuous tone image, such that the halftone image comprises a plurality of pixels corresponding to the plurality of pixels of the continuous tone image, wherein each pixel of the plurality of pixels of the halftone image is associated with a corresponding value that represents an optical density with which the pixel of the halftone image is to be printed, wherein the halftone conversion module is further configured to generate the halftone image by for each pixel of the first subset of the plurality of pixels of the continuous tone image, generating a corresponding pixel of the halftone image to have a value that represents of one of (i) a zero optical density or (ii) a first optical density, and for each pixel of the second subset of the plurality of pixels of the continuous tone image, generating a corresponding pixel of the halftone image to have a value that represents of one of (i) the zero optical density or (ii) a second optical density.

12. The image processing apparatus of claim 11, wherein the halftone conversion module is further configured to generate the halftone image by:

for each pixel of the first subset of the plurality of pixels of the continuous tone image, preventing the corresponding pixel of the halftone image to have a value that represents each of (i) the second optical density or (ii) a third optical density, wherein the third optical density is different from the first optical density and the second optical density.

13. The image processing apparatus of claim 12, wherein the halftone conversion module is further configured to:

determine, for each pixel of the plurality of pixels of the continuous tone image, a sum of quantization errors propagated from one or more corresponding neighboring pixels of the continuous tone image, wherein for a neighboring pixel of the continuous tone image, a quantization error is generated while converting a value of the neighboring pixel to a corresponding value of a corresponding pixel of the halftone image, wherein the halftone conversion module is further configured to prevent the corresponding pixel of the halftone image to have the value that represents each of (i) the second optical density or (ii) the third optical density further by for each pixel of the first subset of the plurality of pixels of the continuous tone image, preventing the corresponding pixel of the halftone image to have the value that represents each of (i) the second optical density or (ii) the third optical density, irrespective of the corresponding sum of quantization errors determined for the corresponding pixel of the first subset of the plurality of pixels of the continuous tone image.

14. The image processing apparatus of claim 11, wherein each pixel of a third subset of the plurality of pixels of the continuous tone image has a corresponding value that is within a third range, and wherein the halftone conversion module is further configured to:

determine, for each pixel of the plurality of pixels of the continuous tone image, a sum of quantization errors propagated from one or more corresponding neighboring pixels of the continuous tone image, wherein for a neighboring pixel of the continuous tone image, a quantization error is generated while converting a value of the neighboring pixel to a corresponding value of a corresponding pixel of the halftone image, wherein the halftone conversion module is further configured to generate the halftone image by for each pixel of the third subset of the plurality of pixels of the continuous tone image, irrespective of the corresponding sum of quantization errors determined for the corresponding pixel of the third subset of the plurality of pixels of the continuous tone image, generating a corresponding pixel of the halftone image having a value that represents only one of (i) a zero optical density or (ii) a third optical density.

15. The image processing apparatus of claim 11, wherein each pixel of a third subset of the plurality of pixels of the continuous tone image has a corresponding value that is within a third range, and wherein the halftone conversion module is further configured to generate the halftone image by:

for each pixel of the third subset of the plurality of pixels of the continuous tone image, generating a corresponding pixel of the halftone image having a value that represents one of (i) the zero optical density, (ii) the first optical density, or (iii) the second optical density, and preventing the corresponding pixel of the halftone image to have a value of a third optical density.

16. The image processing apparatus of claim 11, wherein the halftone conversion module is further configured to:

determine, for each pixel of the plurality of pixels of the continuous tone image, a sum of quantization errors propagated from one or more corresponding neighboring pixels, wherein for a neighboring pixel, a corresponding quantization error is generated while converting a value of the neighboring pixel of the continuous tone image to a corresponding value of a corresponding pixel of the halftone image, wherein the halftone conversion module is further configured to, for each pixel of the first subset of the plurality of pixels of the continuous tone image, generate the corresponding pixel of the halftone image by for a first pixel of the first subset of the plurality of pixels of the continuous tone image, in response to a sum of (i) a corresponding value of the first pixel and (ii) a corresponding sum of quantization errors of the first pixel exceeding a threshold value, assigning a value of the first optical density to the corresponding pixel of the halftone image.

17. The image processing apparatus of claim 16, wherein the halftone conversion module is further configured to, for each pixel of the first subset of the plurality of pixels of the continuous tone image, generate the corresponding pixel of the halftone image by:

for a second pixel of the first subset of the plurality of pixels of the continuous tone image, in response to a sum of (i) a corresponding value of the second pixel and (ii) a corresponding sum of quantization errors of the second pixel being less than the threshold value, assigning a value of the zero optical density to the corresponding pixel of the halftone image.

18. The image processing apparatus of claim 11, wherein the first optical density comprises a low optical density and the second optical density comprises a medium optical density.

19. The image processing apparatus of claim 11, further comprising:
    a laser generation module configured to, for one or more pixels of the plurality of pixels of the halftone image, generate a laser beam based on a corresponding value of the corresponding pixel of the halftone image; and
    a printing module configured to, based on the generated laser beam, print the halftone image.

20. The image processing apparatus of claim 11, wherein the image processing apparatus is a laser printer.

\* \* \* \* \*